United States Patent
Wang et al.

(10) Patent No.: US 12,443,034 B2
(45) Date of Patent: Oct. 14, 2025

(54) OPTICAL FILM AND OPTICAL IMAGING SYSTEM

(71) Applicant: APPOTRONICS CORPORATION LIMITED, Guangdong (CN)

(72) Inventors: Lin Wang, Shenzhen (CN); Hongxiu Zhang, Shenzhen (CN); Xiaofeng Tang, Shenzhen (CN); Fei Hu, Shenzhen (CN); Xin Yu, Shenzhen (CN); Yi Li, Shenzhen (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 828 days.

(21) Appl. No.: 17/641,043

(22) PCT Filed: Aug. 31, 2020

(86) PCT No.: PCT/CN2020/112632
§ 371 (c)(1),
(2) Date: Mar. 7, 2022

(87) PCT Pub. No.: WO2021/047411
PCT Pub. Date: Mar. 18, 2021

(65) Prior Publication Data
US 2022/0326516 A1    Oct. 13, 2022

(30) Foreign Application Priority Data
Sep. 11, 2019 (CN) .......................... 201910859557.3

(51) Int. Cl.
*G02B 27/01* (2006.01)
*B60K 35/231* (2024.01)
(Continued)

(52) U.S. Cl.
CPC ........ *G02B 27/0101* (2013.01); *B60K 35/231* (2024.01); *B60K 35/50* (2024.01);
(Continued)

(58) Field of Classification Search
CPC ............... G02B 27/0101; G02B 17/08; G02B 2027/012; B60K 35/00; B60K 35/23; B60K 2360/23
See application file for complete search history.

(56) References Cited

U.S. PATENT DOCUMENTS 6,236,511 B1   5/2001   Brown
7,656,585 B1   2/2010   Powell et al.
(Continued)

FOREIGN PATENT DOCUMENTS

CN   1485626     3/2004
CN   102193118   9/2011
(Continued)

OTHER PUBLICATIONS

Office Action and Search Report issued in Chinese counterpart application No. 2019108595573, issued on Nov. 24, 2022, 10 pages.
International Search Report for corresponding International Application PCT/CN2020/112632, mailed Dec. 1, 2020.

*Primary Examiner* — Wen Huang
(74) *Attorney, Agent, or Firm* — Burris Law, PLLC (57) ABSTRACT

An optical film and an optical imaging system are provided. The optical film includes a first lens layer, a first deflection layer, a reflection layer, a second deflection layer, and a second lens layer. The second lens layer is attached to a windshield. The reflection layer is configured to reflect an image light beam to form a first reflected light beam and the first lens layer and the first deflection layer are configured to amplify and/or deflect the first reflected light beam, to guide the first reflected light beam to a field-of-view direction. The second lens layer and the second deflection layer are configured to amplify and/or deflect a second reflected light beam, to guide the second reflected light beam to a first direction. The second reflected light beam is formed by that (Continued)

the windshield reflects the image light beam. The field-of-view direction is different from the first direction.

14 Claims, 5 Drawing Sheets

(51) Int. Cl.
*B60K 35/50* (2024.01)
*B60K 35/60* (2024.01)
*G02B 17/08* (2006.01)

(52) U.S. Cl.
CPC .............. *B60K 35/60* (2024.01); *G02B 17/08* (2013.01); *B60K 2360/23* (2024.01); *G02B 2027/012* (2013.01)

(56) References Cited

U.S. PATENT DOCUMENTS

| | | | |
|---|---|---|---|
| 2016/0195727 | A1 | 7/2016 | Kuzuhara et al. |
| 2016/0327792 | A1 | 11/2016 | Matsushita |

FOREIGN PATENT DOCUMENTS

| | | |
|---|---|---|
| CN | 103140791 | 6/2013 |
| CN | 104267498 | 1/2015 |
| CN | 104880825 | 9/2015 |
| CN | 106019796 | 10/2016 |
| CN | 106082712 | 11/2016 |
| CN | 106483664 | 3/2017 |
| CN | 108152959 | 6/2018 |
| JP | 2005067515 | 3/2005 |
| JP | 2016188962 | 11/2016 |
| JP | 2017167541 | 9/2017 |
| WO | 2018190434 | 10/2018 |
| WO | 2019151498 | 8/2019 |

OPTICAL FILM AND OPTICAL IMAGING SYSTEM

CROSS-REFERENCE TO RELATED APPLICATIONS

This application is a National Phase of International Application No. PCT/CN2020/112632, filed on Aug. 31, 2020, which claims priority to and the benefit of CN 201910859557.3, filed on Sep. 11, 2019. The disclosures of the above applications are incorporated herein by reference.

FIELD

The present disclosure relates to the field of display technologies, and in particular, to an optical film and an optical imaging system.

BACKGROUND

The statements in this section merely provide background information related to the present disclosure and may not constitute prior art.

A head up display (HUD) works by projecting useful driving information on a windshield to produce a distant virtual image, thereby improving driving safety and reducing a risk caused by the sight of a driver leaving the road surface.

SUMMARY

This section provides a general summary of the disclosure and is not a comprehensive disclosure of its full scope or all of its features.

A main problem to be resolved in the present disclosure is to provide an optical film and an optical imaging system, to form a virtual image directly when the optical film is attached to a surface of a windshield, and eliminate a ghost.

To resolve the above technical problem, a technical solution adopted in the present disclosure is as follows. An optical film is provided. The optical film includes at least a first lens layer, a first deflection layer, a reflection layer, a second deflection layer, and a second lens layer that are sequentially stacked. The second lens layer is attached to a windshield. The reflection layer is configured to reflect an image light beam to form a first reflected light beam, and the first lens layer and the first deflection layer are configured to amplify and/or deflect the first reflected light beam, so as to guide the first reflected light beam to a field-of-view direction. The second lens layer and the second deflection layer are configured to amplify and/or deflect a second reflected light beam, so as to guide the second reflected light beam to a first direction, wherein the second reflected light beam is formed by that the windshield reflects the image light beam, and the field-of-view direction is different from the first direction.

To resolve the above technical problem, another technical solution adopted in the present disclosure is as follows. An optical film is provided. The optical film includes: at least a first deflection layer, a first lens layer, a reflection layer, a second lens layer, and a second deflection layer that are sequentially stacked. The second lens layer is attached to a windshield. The reflection layer is configured to reflect an image light beam to form a first reflected light beam, and the first lens layer and the first deflection layer are configured to amplify and/or deflect the first reflected light beam, so as to guide the first reflected light beam to a field-of-view direction. The second lens layer and the second deflection layer are configured to amplify and/or deflect a second reflected light beam, so as to guide the second reflected light beam to a first direction, wherein the second reflected light beam is formed by that the windshield reflects the image light beam, and the field-of-view direction is different from the first direction.

To resolve the above technical problem, another technical solution adopted in the present disclosure is as follows. An optical imaging system is provided. The optical imaging system includes an optical film and an image generator. The image generator is configured to generate an image light beam and make the image light beam be incident into the optical film from a first lens layer, the optical film is configured to reflect a part of the image light beam to a field-of-view direction and guide the image light beam reflected by a windshield to a first direction, the field-of-view direction is different from the first direction, and the optical film is the optical film described above.

According to the above solutions, the present disclosure achieves the following beneficial effects.

When the optical film in the optical imaging system is attached to a surface of the windshield as a HUD screen, a virtual image can be formed through the reflection layer, and the image light beam generated by the image generator can be imaged and presented to human eyes without requiring any additional optical imaging device. In addition, the image light beam reflected by the reflection layer of the optical film is guided to the field-of-view direction, and the image light beam reflected by the windshield is guided to the first direction. The first direction is different from the field-of-view direction, so that a virtual image formed by the windshield by reflecting the image light beam cannot be seen by human eyes. Therefore, a ghost can be eliminated and a virtual image generated by the emergent first reflected light beam can be conveniently observed.

Further areas of applicability will become apparent from the description provided herein. It should be understood that the description and specific examples are intended for purposes of illustration only and are not intended to limit the scope of the present disclosure.

DRAWINGS

To describe the technical solutions in the embodiments of the present disclosure more clearly, the drawings required to describe the embodiments are briefly described below. Apparently, the drawings described below are merely some embodiments of the present disclosure. Those skilled in the art may further obtain other drawings based on these drawings without creative efforts. In the drawings.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The technical solutions in the embodiments of the present disclosure are further described below with reference to the accompanying drawings in the embodiments of the present disclosure. Apparently, the described embodiments are merely some rather than all of the embodiments of the present disclosure. All other embodiments obtained by those skilled in the art based on the embodiments of the present disclosure without creative efforts shall fall within the protection scope of the present disclosure.

Figure 1:
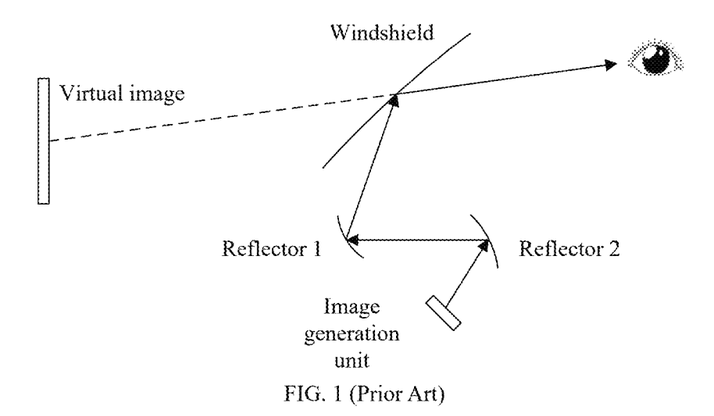
FIG. 1 is a schematic structural diagram of a HUD in the prior art.
Figure 2:
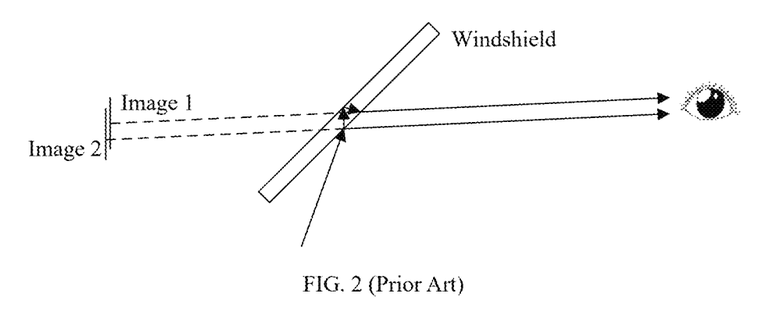
FIG. 2 a schematic structural diagram of generating a ghost by a HUD in the prior art.

In an existing HUD solution, the windshield is used as a final optical surface for imaging, and image amplification and imaging are realized through a series of specular reflections. The windshield itself lacks a good amplification and imaging function. As a result, an imaging group has to include one or two free-form surface reflectors, as shown in FIG. 1. In addition, a rotation angle of the free-form surface reflector has to be adjusted to match different heights of different drivers. Since a plurality of free-form surface reflectors occupy certain space and have to be installed under the windshield, the common method is inserting the free-form surface reflector into a position of an instrument panel under the windshield. However, plenty of disadvantages in imaging are caused by using the windshield directly, for example, a ghost is generated on front and rear surfaces, a plurality of free-form surface reflectors are required to build an optical path, and space in the automobile instrument panel is occupied. A ghost generation principle is shown in FIG. 2. A light beam incident into the windshield is reflected on the two surfaces of the windshield to produce two distant virtual images, respectively. The two virtual images overlap, affecting a viewing effect.

Figure 3:
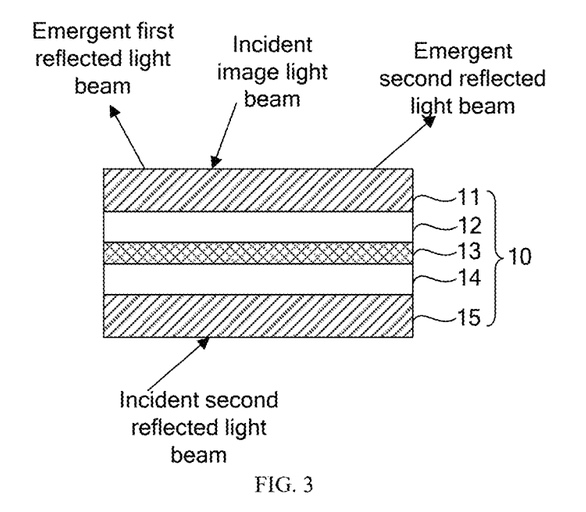
FIG. 3 is a schematic structural diagram of an optical film according to an embodiment of the present disclosure.
Figure 4:
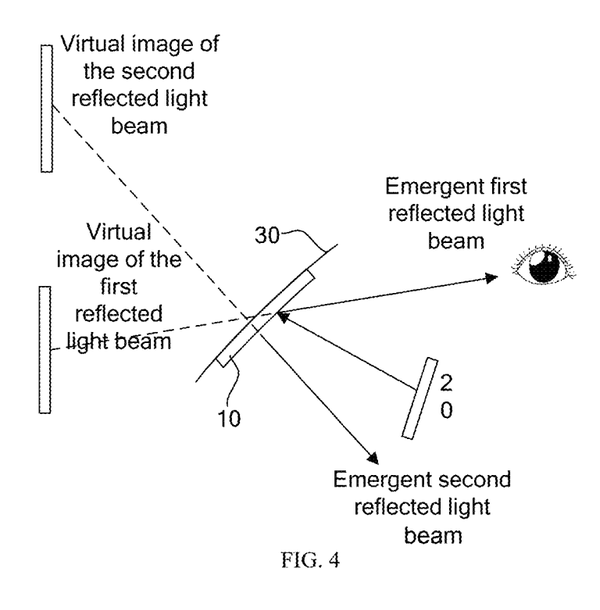
FIG. 4 is a schematic structural diagram of imaging according to the embodiment shown in FIG. 3.

FIG. 3 is a schematic structural diagram of an optical film according to an embodiment of the present disclosure, and FIG. 4 is a schematic structural diagram of imaging according to the embodiment shown in FIG. 3. Referring to FIG. 3 and FIG. 4, the optical film 10 includes at least a first lens layer 11, a first deflection layer 12, a reflection layer 13, a second deflection layer 14, and a second lens layer 15 that are sequentially stacked, where the second lens layer 15 is attached to a windshield 30.

The first lens layer 11 is configured to amplify a received image light beam and transmit the amplified image light beam to the first deflection layer 12. The image light beam may be generated by an image generator 20, and the image generator 20 makes the image light beam be incident into the first lens layer 11 of the optical film 10. The first deflection layer 12 is configured to deflect the amplified image light beam and transmit the deflected image light beam to the reflection layer 13.

The reflection layer 13 is configured to reflect the deflected image light beam to form a first reflected light beam. The first lens layer 11 and the first deflection layer 12 are configured to amplify and/or deflect the first reflected light beam, to guide the first reflected light beam to a field-of-view direction, so as to display a virtual image. The first reflected light beam is emergent from the optical film 10 after passing through the first deflection layer 12 and the first lens layer 11 sequentially.

The second lens layer 15 and the second deflection layer 14 are configured to amplify and/or deflect a second reflected light beam respectively, to guide the second reflected light beam to a first direction. The second reflected light beam is formed by that the windshield 30 reflects the image light beam. The first direction is different from the field-of-view direction. The deflected second reflected light beam is emergent from the optical film 10 after passing through the first deflection layer 12 and the first lens layer 11. Specifically, the second reflected light beam is incident from a side, away from the second deflection layer 14, of the second lens layer 15, and is emergent from the optical film 10 after being amplified by the second lens layer 15, deflected by the second deflection layer 14, transmitted by the reflection layer 13, deflected by the first deflection layer 12, and amplified by the first lens layer 11.

In order to prevent a virtual image generated by the second reflected light beam emergent from the first lens layer 11 from overlapping the virtual image generated by the first reflected light beam emergent from the first lens layer 11 to cause a ghost, a thickness or a material composition of each film layer in the optical film 10 may be set to distinguish the emergent second reflected light beam and first reflected light beam. In this way, the virtual image of the second reflected light beam emergent from the optical film 10 does not overlap the virtual image of the first reflected light beam emergent from the optical film 10, thereby eliminating the ghost.

This embodiment integrates optical functions such as optical amplification and light beam deflection into the optical film 10. The first lens layer 11 and the first deflection layer 12 in the optical film 10 can amplify and/or deflect the incident image light beam. The image light beam is reflected by the reflection layer 13, and then is emergent after passing through the first deflection layer 12 and the first lens layer 11. When the optical film 10 is attached to a surface of the windshield 30, a virtual image is formed directly, and the image light beam generated by the image generator 20 can be transformed into an amplified virtual image that is presented to human eyes without requiring any additional optical imaging device. In the design of the optical film 10, an effective reflection angle of the optical film 10 is distinguished from a reflection angle of the windshield 30. In this way, the image light beam reflected by the optical film 10 is guided to the field-of-view direction, and the image light beam reflected by the windshield 30 is guided to the first direction different from the field-of-view direction. Because the first direction is different from the field-of-view direction, the human eyes cannot see the virtual image reflected by the windshield 30, such that the ghost can be eliminated and it is convenient to observe the virtual image generated by the emergent first reflected light beam.

Figure 5:
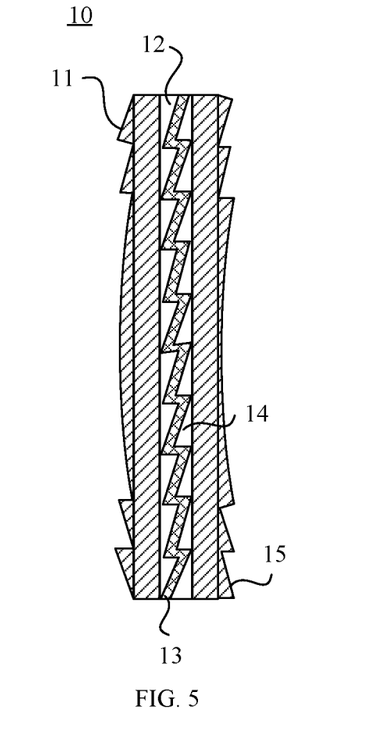
FIG. 5 is a schematic structural diagram of an optical film according to another embodiment of the present disclosure.
Figure 6:
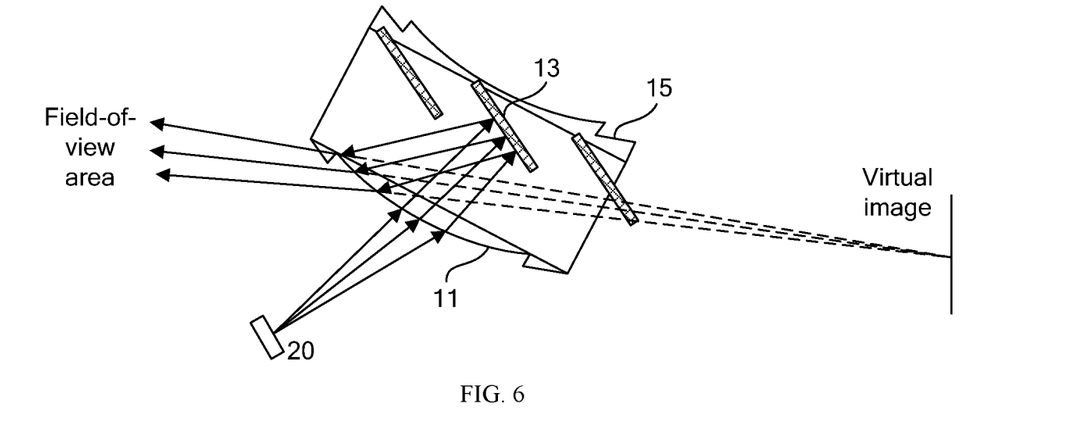
FIG. 6 is a schematic structural diagram of imaging according to the embodiment shown in FIG. 5.

FIG. 5 is a schematic structural diagram of an optical film according to another embodiment of the present disclosure, and FIG. 6 is a schematic structural diagram of imaging according to the embodiment shown in FIG. 5. Referring to FIG. 5 and FIG. 6, the first lens layer 11 and the second lens layer 15 each include a Fresnel prism microstructure (not shown in the figure), and the first deflection layer 12 and the second deflection layer 14 each include a deflection prism microstructure (not shown in the figure).

The Fresnel prism microstructure is mainly used for imaging and amplification. During imaging and amplification, the Fresnel prism microstructure can guide a change of a direction of an optical path. The deflection prism microstructure and the reflection layer 13 are configured to deflect an image light beam and reflect the image light beam to a range that can be observed by human eyes, such that the image light beam emergent from the optical film 10 reaches a field-of-view direction of the human eyes. In this way, the human eyes can observe a virtual image.

The first lens layer 11 has a same refractive index as the second lens layer 15. The Fresnel prism microstructure of the first lens layer 11 and the Fresnel prism microstructure of the second lens layer 15 are complementary structures, to eliminate a phase difference caused by the Fresnel prism microstructures.

The first deflection layer 12 has a same refractive index as the second deflection layer 14. The deflection prism microstructure of the first deflection layer 12 and the deflection prism microstructure of the second deflection layer 14 are complementary structures, to eliminate a phase difference caused by the Fresnel prism microstructures.

In order to facilitate processing, at least one of the first lens layer 11 and the second lens layer 15 may be a rotationally symmetrical structure; at least one of the first deflection layer 12 and the second deflection layer 14 may be a parallel symmetrical structure, in other words, a plurality of prism microstructures in the first deflection layer 12 are parallel and symmetrical to each other, and a plurality of deflection prism microstructures in the second deflection layer 14 are parallel and symmetrical to each other. The reflection layer 13 may adopt a metal film or a dielectric film, the reflection layer 13 has a reflectivity of 10% to 20%, and the reflection layer 13 can transmit or reflect the incident light beam.

A windshield 30 is further configured to transmit an ambient light beam. One of the first lens layer 11 and the second lens layer 15 is a convex lens, and the other is a concave lens. In other words, the first lens layer 11 is a convex lens and the second lens layer 15 is a concave lens; or the first lens layer 11 is a concave lens and the second lens layer 15 is a convex lens.

After the ambient light beam passes through the second lens layer 15, the second deflection layer 14, the reflection layer 13, the first deflection layer 12, and the first lens layer 11 sequentially, the ambient light beam is deflected and its propagation direction remains unchanged. In other words, the first lens layer 11 and the second lens layer 15 that serve as the convex lens and the concave lens are a pair of mutually complementary lenses with a same curvature.

Because the propagation direction of the ambient light beam cannot be changed after the ambient light beam passes through the optical film 10, the first lens layer 11 and the second lens layer 15 are designed as a pair of (convex and concave) lenses, to avoid affecting observation of a driver for a surrounding environment.

The optical film 10 in this embodiment is composed of a plurality of layers of stacked optical surfaces. The optical film 10 includes optical surfaces such as a microstructure imaging surface (including the first lens layer 11, the first deflection layer 12, the second deflection layer 14, and the second lens layer 15), a metal or dielectric reflection surface (including the reflection layer 13), a phase difference compensation surface (including the first lens layer 11, the second lens layer 15, the first deflection layer 12, and the second deflection layer 14). A virtual image can be realized by merely using an optical film 10 attached on the windshield 30, without requiring an independent HUD screen. This can simplify a current HUD system without occupying additional interior space, make it more convenient to install and operate the HUD system, and reduce costs of the system.

Figure 7:
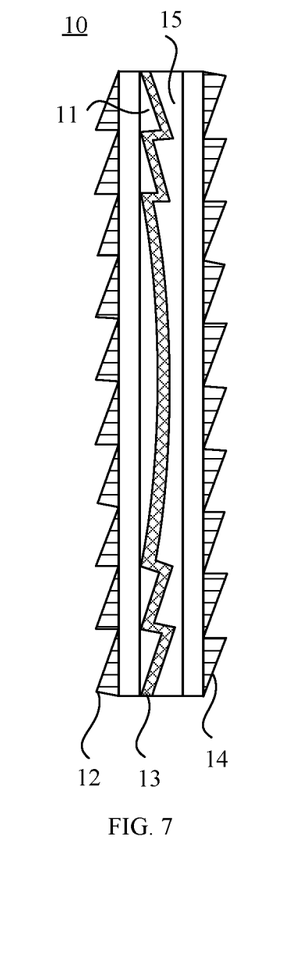
FIG. 7 is a schematic structural diagram of an optical film according to still another embodiment of the present disclosure.

FIG. 7 is a schematic structural diagram of an optical film according to still another embodiment of the present disclosure. Referring to FIG. 7, the optical film 10 includes at least a first deflection layer 12, a first lens layer 11, a reflection layer 13, a second lens layer 15, and a second deflection layer 14 that are sequentially stacked, where the second deflection layer 14 is attached to a windshield (not shown in the figure).

An image generator 20 generates an image light beam and makes the image light beam be incident into the first deflection layer 12. The first deflection layer 12 is configured to deflect the received image light beam and transmit the deflected image light beam to the first lens layer 11.

The first lens layer 11 is configured to amplify the deflected image light beam and transmit the amplified image light beam to the reflection layer 13. The reflection layer 13 is configured to reflect the amplified image light beam to form a first reflected light beam. The first lens layer 11 and the first deflection layer 12 are configured to amplify and/or deflect the first reflected light beam, to guide the first reflected light beam to a field-of-view direction. The first reflected light beam is emergent from the optical film 10 after passing through the first deflection layer 12 and the first lens layer 11 sequentially.

The second deflection layer 14 and the second lens layer 15 are configured to deflect and/or amplify a second reflected light beam, to guide the second reflected light beam to a first direction. The second reflected light beam is formed by that the windshield reflects the image light beam. The first direction is different from the field-of-view direction. The amplified second reflected light beam is emergent from the optical film 10 after passing through the first lens layer 11 and the first deflection layer 12. Specifically, the second reflected light beam is incident from a side, away from the second lens layer 15, of the second deflection layer 14, and is emergent from the optical film 10 after being deflected by the second deflection layer 14, amplified by the second lens layer 15, transmitted by the reflection layer 13, amplified by the first lens layer 11, and deflected by the first deflection layer 12. In addition, to eliminate a ghost, a virtual image of the second reflected light beam emergent from the optical film 10 does not overlap a virtual image of the first reflected light beam emergent from the optical film 10.

The windshield is further configured to transmit an ambient light beam. After the ambient light beam passes through the second deflection layer 14, the second lens layer 15, the reflection layer 13, the first lens layer 11 and the first deflection layer 12 sequentially, the ambient light beam is deflected and its propagation direction remains unchanged.

The first lens layer 11 and the second lens layer 15 each include a Fresnel prism microstructure (not shown in the figure), and a cross-sectional shape of the Fresnel prism microstructure may be a sector, a ring sector, or a triangle. The first deflection layer 12 and the second deflection layer 14 each include a deflection prism microstructure (not shown in the figure).

The deflection prism microstructures are disposed on front and rear surfaces of the optical film 10 respectively, and the Fresnel prism microstructures are disposed inside the optical film 10. The reflection layer 13 with a reflectivity of 10% to 20% is coated on a surface of the Fresnel prism microstructure, in other words, the reflection layer 13 at least partially covers the surface of the Fresnel prism microstructure.

An optical principle of the optical film 10 in this embodiment is similar to that of the optical film in the above embodiments. The deflection prism microstructure is used to perform angular deflection on the light beam, and the Fresnel prism microstructure plays a role of changing a direction of an optical path. After the image light beam emitted by the image generator 20 experiences one time of reflection by the reflection layer 13 and two times of deflections by the deflection prism microstructure of the first deflection layer 12, the first reflected light beam is emergent and incident into the field-of-view direction of human eyes to transform the first reflected light beam into a virtual image visible to the human eyes.

Figure 8:
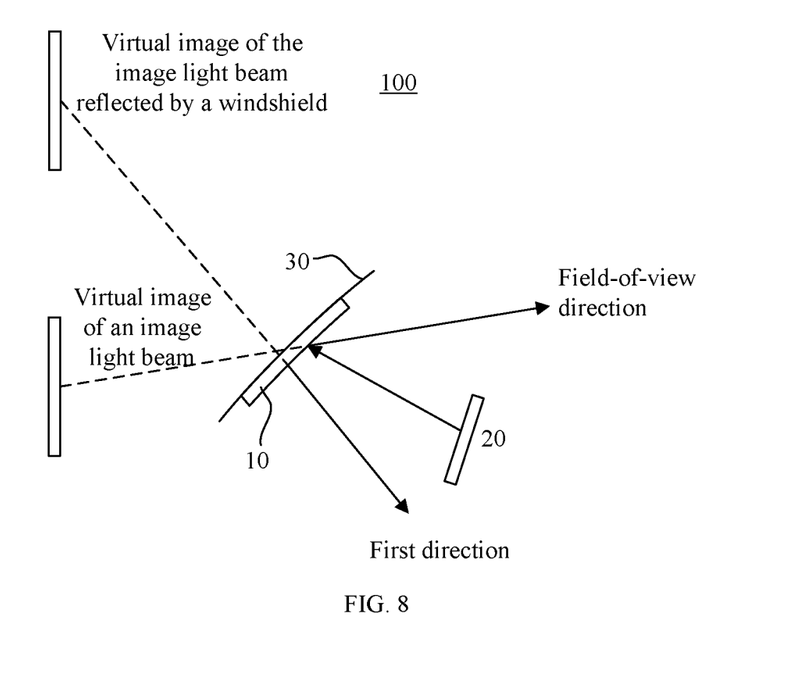
FIG. 8 is a schematic structural diagram of an optical imaging system according to an embodiment of the present disclosure.

FIG. 8 is a schematic structural diagram of an optical imaging system according to an embodiment of the present disclosure. Referring to FIG. 8, the optical imaging system 100 includes an optical film 10 and an image generator 20. The image generator 20 is configured to generate an image light beam and make the image light beam be incident into the optical film 10 from a first lens layer (not shown in the figure). The optical film 10 is configured to reflect the image light beam to a field-of-view direction, and guide the image light beam reflected by a windshield 30 to a first direction. The field-of-view direction is different from the first direction, and the optical film 10 is the optical film 10 described in the above embodiments.

When the optical film 10 in the optical imaging system 100 is attached to a surface of the windshield 30 as a HUD screen, a virtual image can be formed through a reflection layer (not shown in the figure), and the image light beam generated by the image generator 20 can be imaged and presented to human eyes without requiring any additional optical imaging device. In addition, the image light beam reflected by the reflection layer of the optical film 10 is guided to the field-of-view direction, and the image light beam reflected by the windshield 30 is guided to the first direction. Because the first direction is different from the field-of-view direction, the human eyes cannot see a virtual image formed by that the windshield 30 reflects the image light beam. Therefore, a ghost can be eliminated and it is convenient to observe a virtual image generated by an emergent first reflected light beam.

The above described are merely embodiments of the present disclosure, which do not constitute a limitation on the scope of the patent of the present disclosure. Any equivalent structure or equivalent process change made based on the description and drawings of the present disclosure, or direct or indirect application thereof in other related technical fields, should still fall within the protection scope of the patent of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An optical film, comprising at least a first lens layer, a first deflection layer, a reflection layer, a second deflection layer, and a second lens layer that are sequentially stacked, wherein the second lens layer is attached to a windshield;
the first lens layer is configured to amplify an image light beam and transmit the amplified image light beam to the first deflection layer;
the first deflection layer is configured to deflect the amplified image light beam and transmit the deflected image light beam to the reflection layer;
the reflection layer is configured to reflect and transmit the deflected image light beam, the deflected image light beam reflected by the reflection layer forms a first reflected light beam, and the first lens layer and the first deflection layer are configured to amplify and/or deflect the first reflected light beam, so as to guide the first reflected light beam to a field-of-view direction; and
the deflected image light beam transmitted by the reflection layer passes through the second deflection layer and the second lens layer, and is reflected by the windshield to form a second reflected light beam; the second lens layer and the second deflection layer are configured to amplify and/or deflect the second reflected light beam, so as to guide the second reflected light beam to a first direction different from the field-of-view direction.

2. The optical film according to claim 1, wherein
the first lens layer has a same refractive index as the second lens layer, and each of the first lens layer and the second lens layer is a rotationally symmetrical structure.

3. The optical film according to claim 2, wherein
the first lens layer and the second lens layer each comprise a Fresnel prism microstructure, and the Fresnel prism microstructure of the first lens layer and that of the second lens layer are complementary structures.

4. The optical film according to claim 1, wherein
the first deflection layer has a same refractive index as the second deflection layer, and each of the first deflection layer and the second deflection layer is a parallel symmetrical structure.

5. The optical film according to claim 4, wherein
the first deflection layer and the second deflection layer each comprise a deflection prism microstructure, and the deflection prism microstructure of the first deflection layer and that of the second deflection layer are complementary structures.

6. The optical film according to claim 1, wherein
the reflection layer is a metal film or a dielectric film, and the reflection layer has a reflectivity ranging from 10% to 20%.

7. The optical film according to claim 1, wherein
the windshield is further configured to transmit an ambient light beam, one of the first lens layer and the second lens layer is a convex lens and the other one is a concave lens; and a propagation direction of the ambient light beam remains constant after deflected by passing through the second lens layer, the second deflection layer, the reflection layer, the first deflection layer, and the first lens layer.

8. The optical film according to claim 1, wherein
the reflection layer at least partially covers a surface of a Fresnel prism microstructure, and a cross-sectional shape of the Fresnel prism microstructure is one of a sector, a ring fan, or a triangle.

9. An optical imaging system, comprising an optical film and an image generator, wherein the image generator is configured to generate an image light beam and make the image light beam be incident into the optical film from a first lens layer, the optical film is configured to reflect a part of the image light beam to a field-of-view direction and guide the image light beam reflected by a windshield to a first direction, the field-of-view direction is different from the first direction, and the optical film comprises at least a first lens layer, a first deflection layer, a reflection layer, a second deflection layer, and a second lens layer that are sequentially stacked,
wherein the second lens layer is attached to the windshield;
the first lens layer is configured to amplify an image light beam and transmit the amplified image light beam to the first deflection layer;
the first deflection layer is configured to deflect the amplified image light beam and transmit the deflected image light beam to the reflection layer;
the reflection layer is configured to reflect and transmit the deflected image light beam, the deflected image light beam reflected by the reflection layer forms a first reflected light beam, and the first lens layer and the first deflection layer are configured to amplify and/or deflect the first reflected light beam, so as to guide the first reflected light beam to the field-of-view direction; and
the deflected image light beam transmitted by the reflection layer passes through the second deflection layer and the second lens layer, and is reflected by the windshield to form a second reflected light beam; the second lens layer and the second deflection layer are configured to amplify and/or deflect the second reflected light beam, so as to guide the second reflected light beam to the first direction different from the field-of-view direction.

10. The optical imaging system according to claim 9, wherein the first lens layer has a same refractive index as the second lens layer, and each of the first lens layer and the second lens layer is a rotationally symmetrical structure.

11. The optical imaging system according to claim 10, wherein the first lens layer and the second lens layer each comprise a Fresnel prism microstructure, and the Fresnel prism microstructure of the first lens layer and that of the second lens layer are complementary structures.

12. The optical imaging system according to claim 9, wherein the first deflection layer has a same refractive index as the second deflection layer, and each of the first deflection layer and the second deflection layer is a parallel symmetrical structure.

13. The optical imaging system according to claim 12, wherein the first deflection layer and the second deflection layer each comprise a deflection prism microstructure, and the deflection prism microstructure of the first deflection layer and that of the second deflection layer are complementary structures.

14. The optical imaging system according to claim 9, wherein the reflection layer is a metal film or a dielectric film, and the reflection layer has a reflectivity ranging from 10% to 20%.

* * * * *